United States Patent [19]

Liang

[11] Patent Number: 4,724,914

[45] Date of Patent: Feb. 16, 1988

[54] WEIGHING SCALE HAVING A SHOCK-ABSORBING TRANSDUCER SUPPORT

[75] Inventor: Charles Liang, Des Plaines, Ill.

[73] Assignee: Pelouze Scale Company, Evanston, Ill.

[21] Appl. No.: 86,353

[22] Filed: Aug. 17, 1987

[51] Int. Cl.⁴ .......................................... G01G 21/10
[52] U.S. Cl. .................................................. 177/187
[58] Field of Search ......................... 177/184–189

[56] References Cited

U.S. PATENT DOCUMENTS

| | | | |
|---|---|---|---|
| 3,648,790 | 3/1972 | Bishop | 177/184 X |
| 4,058,179 | 11/1977 | Price | 177/187 X |
| 4,094,368 | 6/1978 | Sann et al. | 177/187 X |

Primary Examiner—George H. Miller, Jr.
Attorney, Agent, or Firm—A. G. Douvas

[57] ABSTRACT

A weigh scale comprising a platform, a base, a transducer coupled to the platform, and a shock-absorbing compound spring having two serially-connected sections. One spring section flexes most favorably in a vertical direction and the other section in a horizontal direction. The compound spring moveably supports the transducer on the base so that shock forces applied to the platform from different directions are absorbed by the spring to prevent permanent distortion of the transducer and the resulting erroneous weight readings.

10 Claims, 8 Drawing Figures

WEIGHING SCALE HAVING A SHOCK-ABSORBING TRANSDUCER SUPPORT

BACKGROUND OF THE INVENTION

This invention relates to an improved shock-absorbing support for a load-cell transducer used in a weighing scale.

Load-cell transducers are employed extensively in scales because of their accuracy in measuring weights. These transducers are generally characterized by a metallic body having a rectangular perimeter, an opposing pair of perimeter surfaces carry surface-mounted, resistor strain gauges. The central portion of the body is machined to form a rigidly-specified opening beneath the strain gauges to define a desired bending curve in the body. When the gauges are interconnected to form an electrical bridge or other network, and the transducer body is used as a contilevered support for a weighing platform, temporary deformations in the transducer body are translated into electrical signals accurately responsive to weights placed on the platform.

Weighing accuracy is maintained so long as the transducer body is not permanently deformed. Unfortunately, many users of platform scales subject the platform to shock forces by buffeting and banging the platform. While the transducer is usually spring-mounted so as to absorb the resulting shock and thus avoid permanent damage to the transducer body, these prior-art spring supports are effective only to absorb platform blows applied generally vertically to the platform. Side blows containing a substantial horizontal component applied to the platform are ineffectively absorbed.

Accordingly, a principal object of this invention is to improve the accuracy and durability of weighing scales employing load-cell transducers.

Another object is to improve the shock-absorbing effectiveness of spring-supported load cells used in weighing scales.

Another object is to extend and broaden the angular range through which shock forces applied to a scale platform coupled to a load-cell transducer can be effectively absorbed.

Another object is to provide a shock-absorbing spring support for a load-cell transducer which absorbs shock forces applied to a scale platform either vertically and horizontally, or vector combinations of these forces.

SUMMARY OF THE INVENTION

Accordingly, a principal structural feature of this invention relates to a novel compound-spring support for a load-cell transducer used in a platform weighing scale. This spring has two serially-connected spring sections each designed to flex in different directions. In a preferred embodiment, the compound spring is formed with a U-section designed to flex in a vertical direction and a second rectangular-shaped section designed to flex in the horizontal direction. The vertical-flexing spring section comprises two spaced parallel arms lying in separated horizontal planes extending from and joined together by a common linking segment. The horizontal-flexing spring section also comprises two spaced, parallel arms lying in separated vertical planes extending from and joined together by the linking segment.

One end of the vertical-flexing spring section is fixed to the scale base; and the remote end of the horizontal-flexing spring section carries, in a cantilever fashion, a metal body of the load-cell transducer. The scale platform is supported on an end of the transducer body opposite the spring-supported end.

With this disposition of components, any blow to the platform, whether directed horizontally or vertically, is absorbed by the composite spring; thus, permanent distortions in the metal body of the transducer which produce readout-weight errors are avoided.

DESCRIPTION OF THE DRAWINGS

In order that all of the structural features for attaining the objects of this invention may be readily understood, detailed reference is made to the drawings in which.

DETAILED DESCRIPTION OF THE PREFERRED EMBODIMENT

Figure 1:
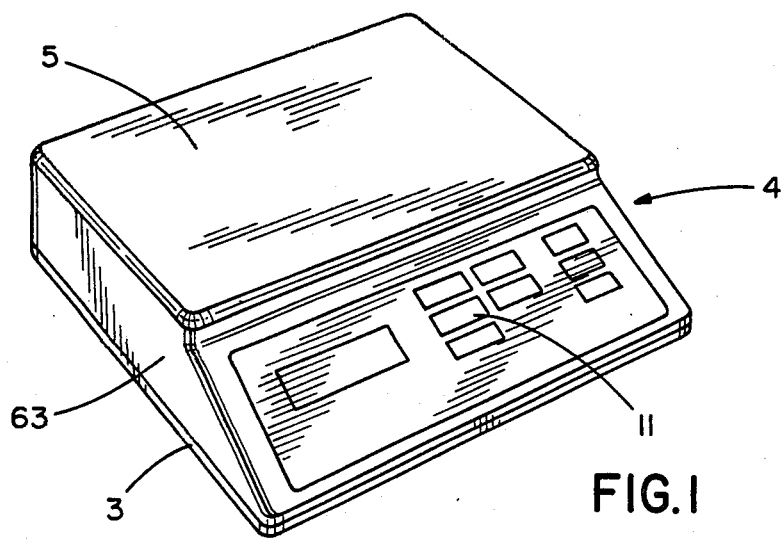
FIG. 1 is a perspective view of the exterior of a typical platform weighing scale to which the shock-absorbing transducer support of this invention may be applied.

Referring to the drawings, shock-absorbing compound spring 1 (FIGS. 2-7) of this invention provides a cantilever support for load-cell transducer 2 on base 3 of platform weighing scale 4 (FIG. 1). Transducer 2 in turn supports scale platform 5. In the event platform 5 is subjected to excessive vertical or horizontal shock forces, or vector combinations of these forces, metallic body 6 of transducer 2 may be permanently distorted, thus causing the typical bridge network of resistor strain gauges 7, 8, 9 and 10 applied to the upper and lower surfaces of transducer body 6 to generate constantly erroneous weight readings at digital readout display 11 (FIG. 1).

The stresses tending to deform body 6 permanently can be relatively large because any shock force to which platform 5 is subjected is applied to a cantilevered and freely moving end of transducer body 6 located approximately the entire length of body 6 from an opposite base supported end. In particular, saddle 12, which carries platform 5 (FIG. 3), is secured to left end 13 of transducer body 6 by a pair of bolts 14. The right end 15 of transducer body 6 is supported either directly or indirectly on base 3 in prior art weighing scales. With direct support on base 3, any intense shock force applied to platform 5 will produce severe strains upon transducer body 6. However, if body 6 is indirectly supported on base 3 through a shock-absorbing mechanism, such as compound spring 1 of this invention, the stresses on body 6 can be reduced so that no permanent deformation can occur.

In the structure of this invention, an indirect, shock-absorbing transducer support is effected by compound spring 1 which has two spring sections $1v$ and $1h$ coupled in a series disposition. Each section is designed to flex in a direction displaced 90° from the other. In particular, compound spring 1 is formed with a first U-shaped section $1v$ designed to flex in the vertical direction and a second rectangular-shaped section $1h$ designed to flex in the horizontal direction. Vertical-flexing spring section $1v$ comprises two, spaced, parallel arms 16 and 17 extending from and joined together by linking segment 18. Linking segment 18 is common to both sections $1v$ and $1h$. When scale 4 is seated on a horizontal surface for a proper weighing operation, unstressed arms 16 and 17 lie in separated, generally-horizontal planes and linking segment 18 lies in a generally-vertical plane.

Figure 6:
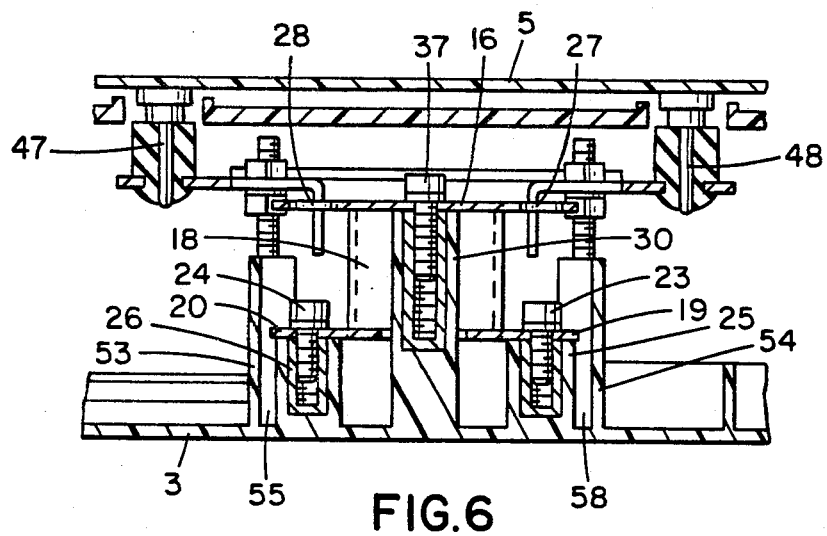
FIG. 6 is a section view taken along line 6—6 of FIG. 1 which shows details of the mounting attachment of the compound spring to the scale base.

Arm 17 is formed with two projecting mounting flanges 19 and 20. Flange 19 is formed with a mounting hole 21, and flange 20 is formed with a mounting hole 22. As is best shown in FIG. 6, bolt 23 passes through mounting hole 21 and bolt 24 passes through mounting hole 22 to secure arm 17 to short threaded anchor posts 25 and 26 formed as an integral part of base 3. Arm 16 is formed with two large tool access holes 27 and 28 (FIG. 3) so that bolts 23 and 24 can be tightened or loosened by a tool, as is required.

Figure 3:
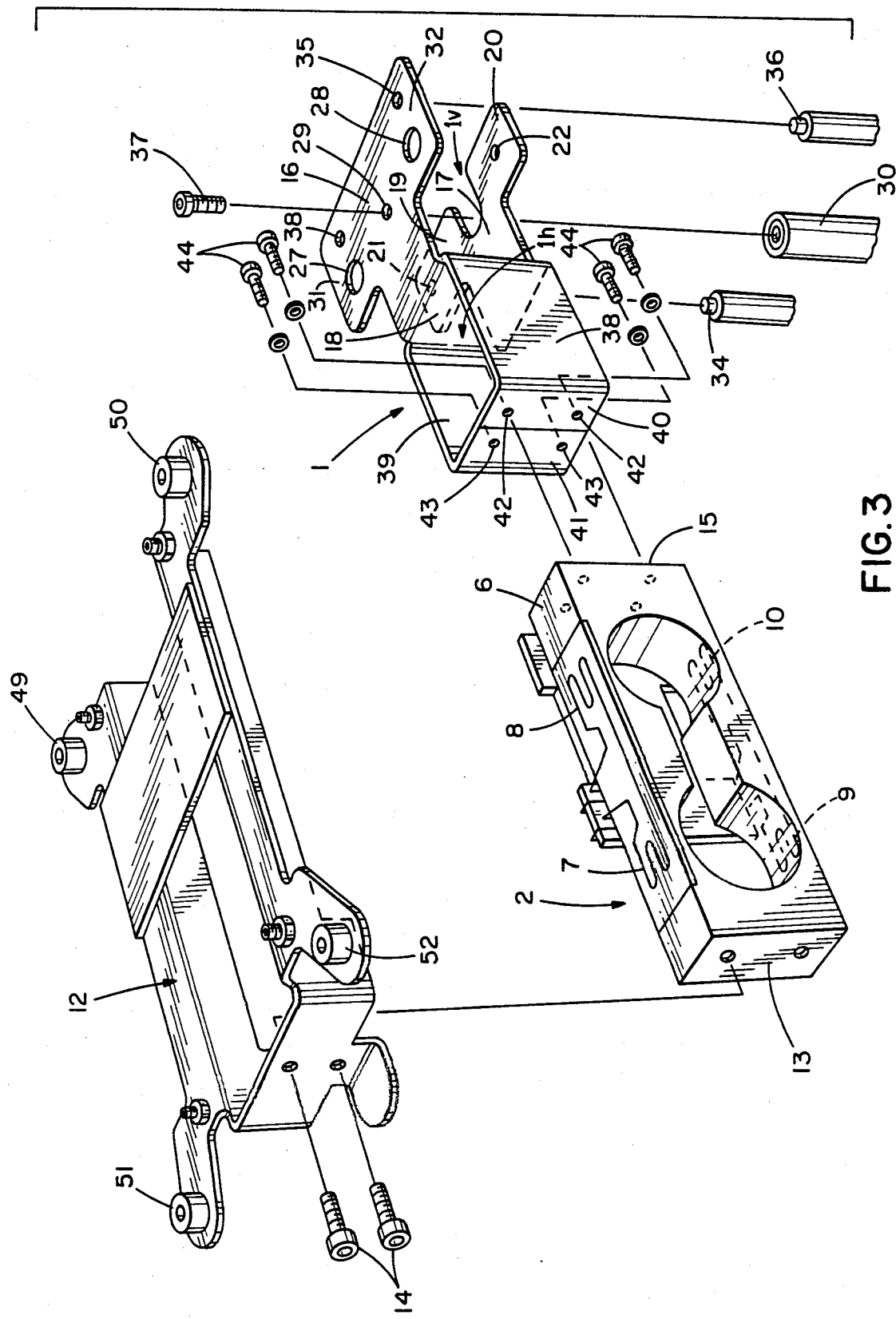
FIG. 3 is an exploded view which shows the manner of assembly of the principal components of this invention, namely, the shock-absorbing compound spring, the load-cell transducer, and the platform support saddle.
Figure 4:
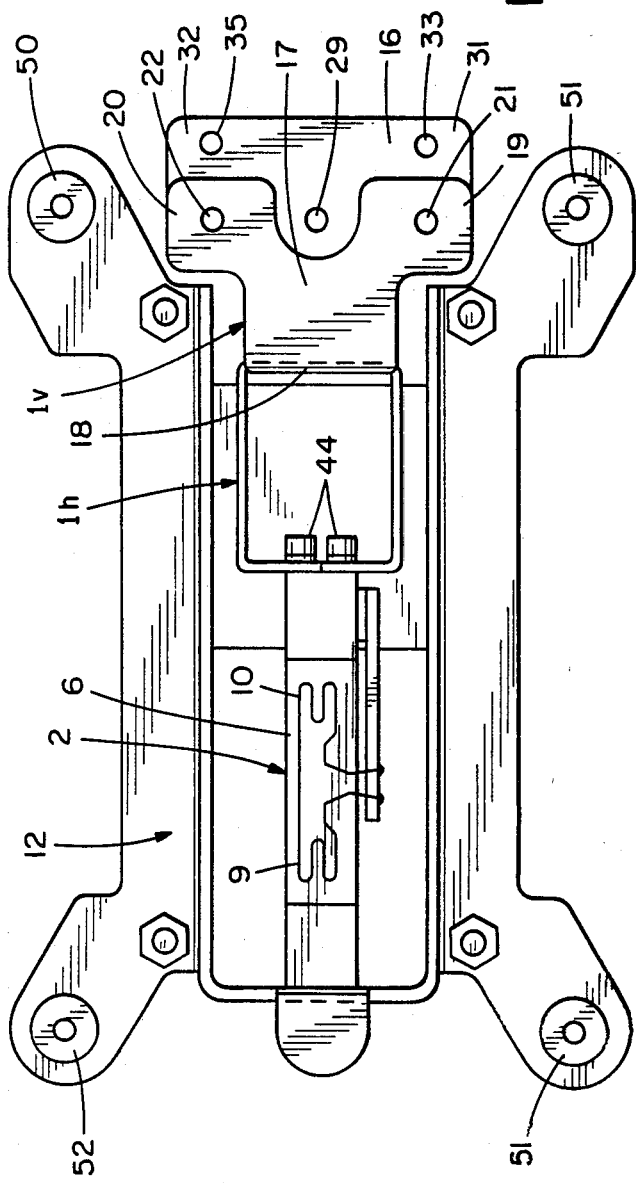
FIG. 4 is a bottom view of the principal components of FIG. 3 in assembled form.
Figure 5:
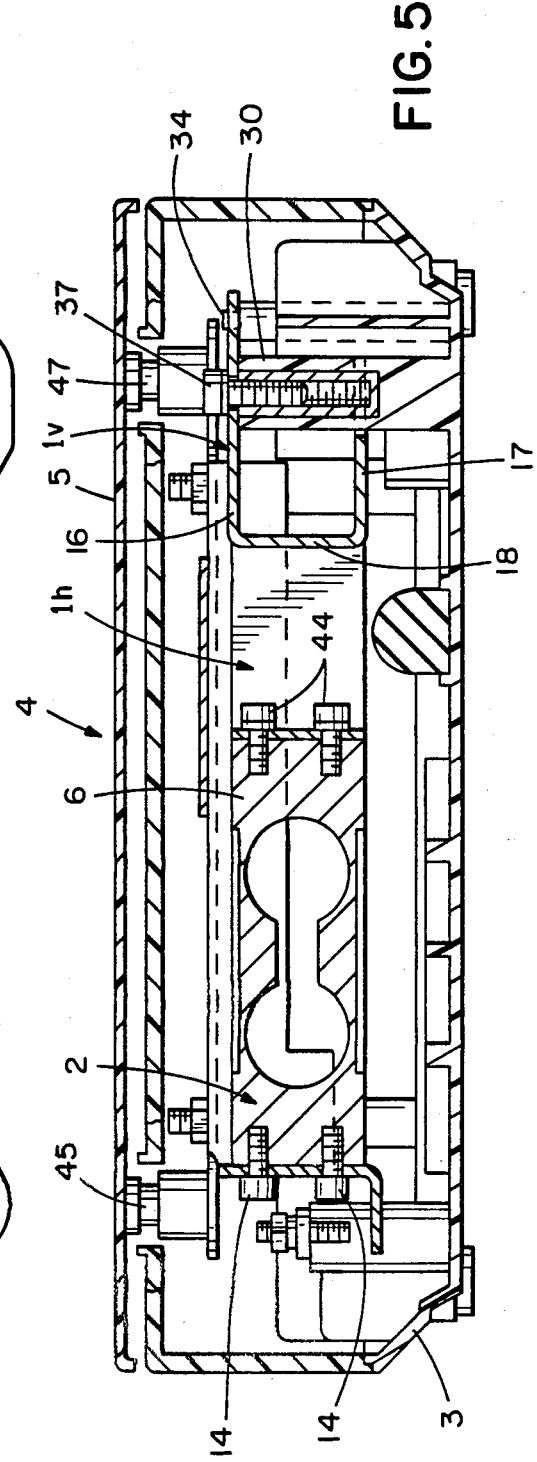
FIG. 5 is a section view taken along line 5—5 of FIG. 1 which also shows the assembly of the principal components of FIGS. 3 and 4.
Figure 8:
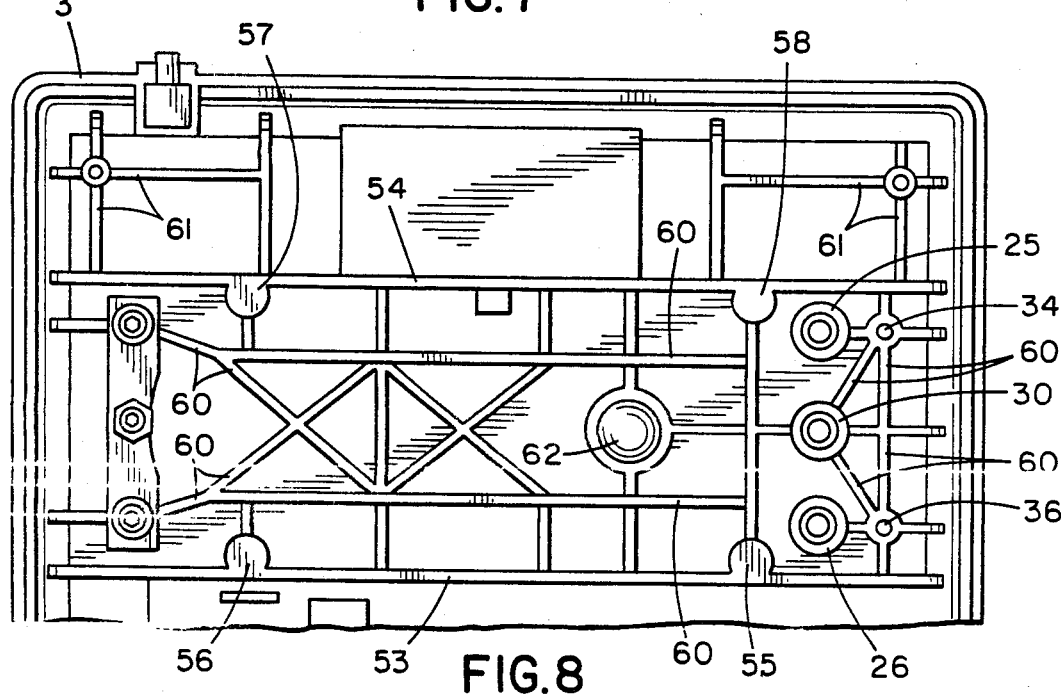
FIG. 8 is a plan view of a portion of the base of the scale which shows details of the reinforcing walls and ribs of the base.

Arm 16 is also formed with a central mounting hole 29. Bolt 37 is seated in this hole (FIG. 6) to fasten arm 16 to tall anchor post 30 formed as an integral part of base 3. Arm 16 (FIG. 3) is also formed with a pair of projecting flanges 31 and 32. Flange 31 is formed with alignment hole 33 which receives alignment pin 34 (FIGS. 3 and 8) and flange 32 is formed with alignment hole 35 which receives alignment pin 36 (FIGS. 3 and 8). Both pins 34 and 36 are integral with and project from base 3 to pass through their respective alignment holes. Accordingly, bolts 23, 24 and 37, and pins 34 and 36 anchor spring section $1v$ to base 3.

Spring sections $1v$ and $1h$ are coupled in series through common linking segment 18.

Horizontal-flexing spring section $1h$ comprises two, spaced, parallel arms 38 and 39 extending from and joined together by linking segment 18. Arms 38 and 39 are located in planes disposed 90° from the planes containing arms 16 and 17, thus providing series flexing in two planes. Transducer mounting flanges 40 and 41 project inwardly from arms 38 and 39, respectively. Mounting flange 40 is formed with a pair of transducer mounting holes 42, and mounting flange 41 is formed with a pair of transducer mounting holes 43 (FIG. 3). A set of four bolts 44 (FIG. 3) secure the right end 15 of transducer body 6 to mounting flanges 40 and 41.

Figure 2:
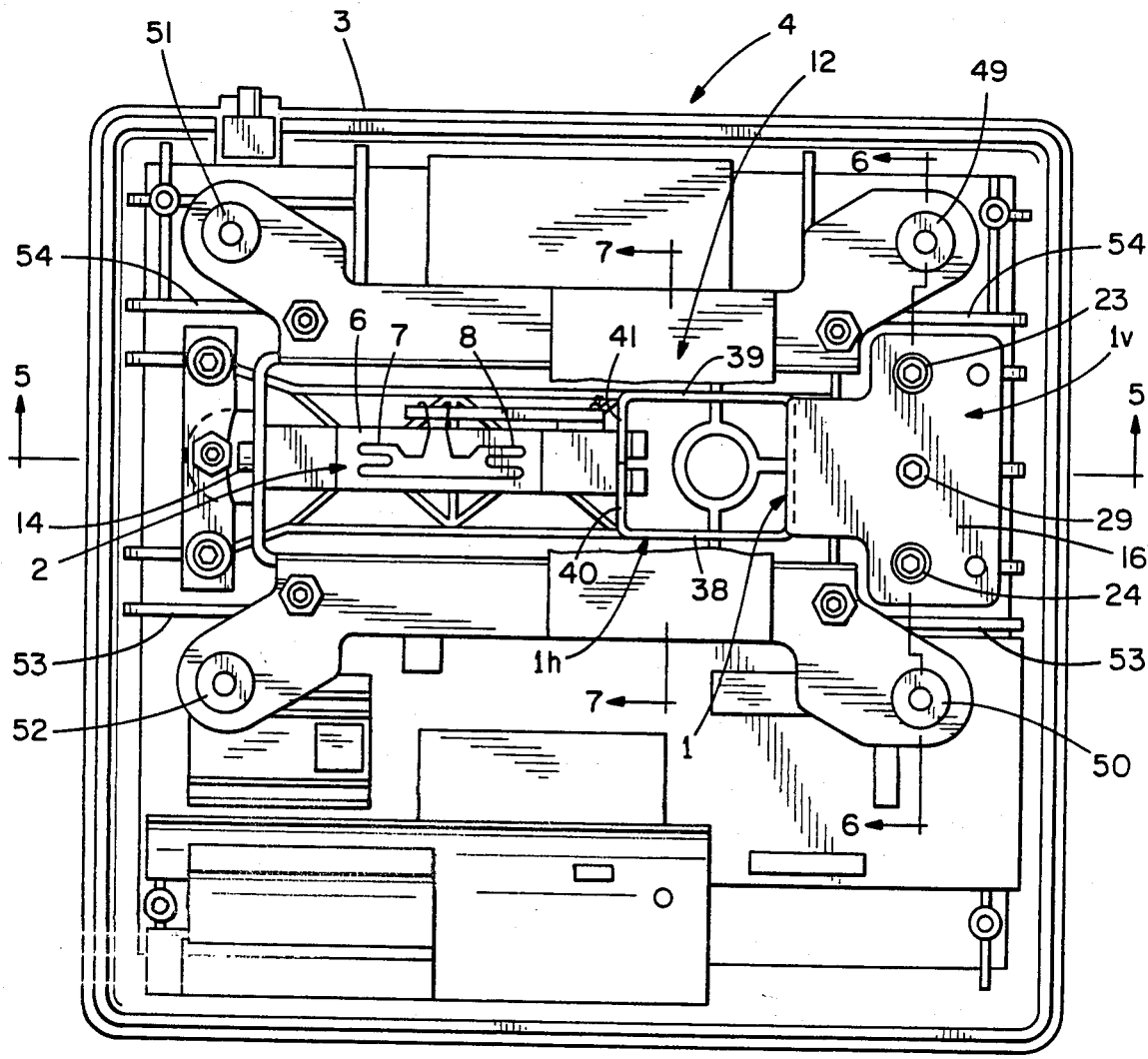
FIG. 2 is a plan view of the scale of FIG. 1, with the housing and the platform removed to show a preferred embodiment of the transducer support employing a shock-absorbing compound spring to support the load-cell transducer of the scale.

Platform 5 is formed with a set of four platform alignment pins 45, 46, 47 and 48 (FIGS. 6 and 7) fixed to and projecting from the bottom of platform 5. Platform 5 is removably seated upon saddle 12 by inserting the pin set into rubber pin sockets 49, 50, 51 and 52 (FIGS. 2 and 3). Accordingly, platform 5 is cantilever supported on saddle 12 by transducer body 6 and the series-connected spring sections $1h$ and $1v$, with spring section $1v$ being fixed to base 3.

A weight placed on platform 5 produces a flexing of body 6 of transducer 1 which is translated into a weight-indicating signal by a bridge circuit comprising resistor strain guages 7, 8, 9 and 10. U.S. Pat. No. 3,576,128 issued Apr. 27, 1971 to Lockery describes in detail the mode of operation of a multiple bending parallelogram beam employing bridge-connected strain gauges.

When the platform weight is removed, metallic body 6 of transducer 1 returns to its normal unstressed condition. However, excessive shock forces applied to a rigidly supported transducer body through a platform can produce a permanent distortion of the body which will destroy the balance and thus the accuracy of the bridge-circuit strain gauges. Prior art scales have minimized the effects of these shock forces by supporting the transducer on a pair of spring arms which flex in a single direction, mainly vertical. The design is adequate for absorbing vertical shock forces applied to the platform; however, many shock forces have horizontal components which are not adequately absorbed because the transducer body is essentially rigid to shock forces having horizontal components. Accordingly, the novel design of compound spring 1 which features a serially-connected pair of spring sections, with each section designed to flex in a different direction, effectively absorbs shock forces having components acting in different directions or planes.

In a preferred embodiment, compound spring 1 is preferably fabricated from a single piece of high-grade stainless steel. It is not necessary to employ spring steel; however, the stainless steel should have a high degree of elasticity with respect to bending forces.

While the particular embodiment of compound spring shown in the drawings has vertical spring section $1v$ fixed to base 3, and horizontal spring section $1h$ fixed to transducer body 6, the disposition of these spring sections could be reversed with shock-absorbing efficiency being maintained. Additionally, transducer mounting flanges 40 and 41 can be eliminated, and arms 38 and 39 can be extended and appropriately bent with the ends being attached to the sides of transducer body 6.

Figure 7:
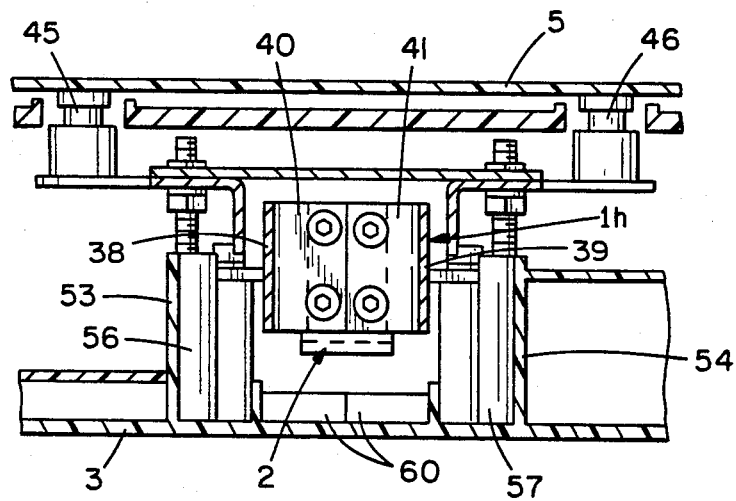
FIG. 7 is a section view taken along line 7—7 of FIG. 1 which shows details of the mounting attachment of the load-cell transducer to the flexing end of the compound spring.

It is essential to weighing accuracy that base 3 not flex in response to a weight placed on platform 5. Plastic base 3 is made rigid by a lattice of plastic reinforcing walls and ribs integrally molded to the inside bottom of base 3 (FIGS. 6–8). A pair of spaced high walls 53 and 54 extend substantially the width of base 3. Posts 55, 56, 57 and 58 strengthen wall 53 and 54. A lattice of short reinforcing ribs 60 is sandwiched between walls 53 and 54 to further strengthened base 3. Additional reinforcing ribs 61 are located outside of high walls 53 and 54 to strengthen the outlying areas of base 3.

Compound spring 1 and transducer 2 are disposed between walls 53 and 54 immediately above the lattice formed by ribs 60. A rubber limit stop 62 (FIG. 8) is located immediately below, but separated from, spring arm 17. Cover 63 encloses the interior structure of scale 4.

It should be understood that the above described structure is merely illustrative of one application of the principles of this invention. Modifications can be made without departing from the scope of the invention.

What is claimed is:

1. A weighing scale comprising a platform, a base, a transducer coupled to the platform, a shock-absorbing spring having two sections each of which flexes in two different directions with the spring moveably supporting the transducer on the base so that shock forces applied to the platform from different directions are absorbed by the spring to prevent permanent distortion of the transducer and the resulting erroneous weight readings.

2. The combination of claim 1 in which the shock-absorbing spring is a compound spring having two serially-connected spring sections, with each section flexing most favorably in different directions.

3. The combination of claim 2 in which one spring section flexes most favorably in a direction approximately 90° from the direction of optimal flexing of the other section.

4. The combination of claim 3 in which the one spring section flexes most favorably in a vertical direction and the other in a horizontal direction when the weighing platform is moveable along a generally vertical axis.

5. The combination of claim 2 in which each spring section comprises two spaced generally parallel arms.

6. The combination of claim 5 in which the arms of both sections are joined by a linking segment, with the linking segment lying in a plane generally normal to the planes in which all arms lie.

7. The combination of claim 5 in which a first end of the compound spring is fixed to the base and an opposite end of the spring is fixed to the transducer thus being cantilever supported from the base.

8. The combination of claim 7 in which the platform is supported by an end of the transducer opposite the transducer end supported by the spring with the platform thus being cantilever supported from the base by the serially-connected transducer and the compound spring.

9. The combination of claim 8 in which each arm comprises a generally flat, thin metallic element.

10. The combination of claim 9 in which the metallic arm elements are stainless steel.

* * * * *